(12) United States Patent
Larson et al.

(10) Patent No.: US 7,888,901 B2
(45) Date of Patent: Feb. 15, 2011

(54) ACTIVE HUMAN-MACHINE INTERFACE SYSTEM INCLUDING AN ELECTRICALLY CONTROLLABLE DAMPER

(75) Inventors: Keith D. Larson, Petoskey, MI (US); Joseph M. Walling, Boyne City, MI (US); John K. Tillotson, Petoskey, MI (US)

(73) Assignee: Honeywell International Inc., Morristown, NJ (US)

( * ) Notice: Subject to any disclaimer, the term of this patent is extended or adjusted under 35 U.S.C. 154(b) by 779 days.

(21) Appl. No.: 11/835,554

(22) Filed: Aug. 8, 2007

(65) Prior Publication Data

US 2008/0115061 A1    May 15, 2008

Related U.S. Application Data

(60) Provisional application No. 60/859,790, filed on Nov. 15, 2006.

(51) Int. Cl.
*G05B 11/01* (2006.01)
(52) U.S. Cl. .......... 318/628; 318/611; 318/568.11
(58) Field of Classification Search .......... 318/628, 318/611, 568.11, 567, 663, 626, 286, 640; 700/63, 85
See application file for complete search history.

(56) References Cited

U.S. PATENT DOCUMENTS

| | | | |
|---|---|---|---|
| 3,699,369 A | 10/1972 | Hlipala et al. | |
| 4,861,269 A | 8/1989 | Meenen, Jr. | |
| 5,116,174 A * | 5/1992 | Fried et al. | 409/79 |
| 6,104,382 A | 8/2000 | Martin et al. | |
| 6,283,859 B1 | 9/2001 | Carlson et al. | |
| 6,339,419 B1 | 1/2002 | Jolly et al. | |
| 6,373,465 B2 | 4/2002 | Jolly et al. | |
| 6,378,671 B1 | 4/2002 | Carlson | |
| 6,486,872 B2 | 11/2002 | Rosenberg et al. | |
| 6,557,662 B1 | 5/2003 | Andonian et al. | |
| 6,644,600 B1 | 11/2003 | Olson et al. | |
| 6,886,819 B2 | 5/2005 | Kintz et al. | |
| 6,953,108 B2 | 10/2005 | Anderfaas et al. | |
| 6,974,000 B2 | 12/2005 | Carlson et al. | |
| 7,113,166 B1 | 9/2006 | Rosenberg et al. | |
| 2003/0183728 A1 | 10/2003 | Huynh | |
| 2006/0009891 A1 | 1/2006 | Pawlak et al. | |
| 2006/0197741 A1 | 9/2006 | Biggadike | |

* cited by examiner

*Primary Examiner*—Karen Masih
(74) *Attorney, Agent, or Firm*—Ingrassia Fisher & Lorenz, P.C.

(57) ABSTRACT

An active human-machine interface system includes a user interface, one or more motors, one or more motor controllers, one or more electrically controllable dampers, and one or more damper controllers. The motors are coupled to the user interface and are configured, upon being energized, to supply a haptic feedback force to the user interface. The motor controllers are coupled to, and configured to selectively energize, the motors. The electrically controllable dampers are coupled to the user interface and are configured, upon being energized, to supply a damping force to the user interface. The damper controllers are in operable communication with the motor controllers and are coupled to, and configured to selectively energize, the electrically controllable dampers.

14 Claims, 4 Drawing Sheets

ACTIVE HUMAN-MACHINE INTERFACE SYSTEM INCLUDING AN ELECTRICALLY CONTROLLABLE DAMPER

CROSS-REFERENCES TO RELATED APPLICATIONS

This application claims the benefit of U.S. Provisional Application No. 60/859,790, filed Nov. 15, 2006.

TECHNICAL FIELD

The present invention relates to human-machine interfaces and, more particularly, to an active human-machine interface system that includes electrically controllable dampers.

BACKGROUND

Human-machine interfaces that are used to translate human movements to machine movements are used in myriad industries. For example, some aircraft flight control systems include a human-machine interface in the form of one or more control sticks. The flight control system, in response to input forces supplied to the control stick from the pilot, controls the movements of various aircraft flight control surfaces. No matter the particular end-use system, the human-machine interface preferably includes some type of haptic feedback mechanism back through the interface to the interface operator. In some implementations, the haptic feedback mechanisms are active mechanisms that include one or more electrically controlled motors to supply force feedback to the human-machine interface.

Although unlikely, it is postulated that the electrically controlled motor, or other electrical or mechanical portions of the feedback mechanism, could become inoperable. Thus, in addition to the active feedback mechanism, many human-machine interfaces are also implemented with one or more passive feedback mechanisms, such as one or more springs. These backup mechanisms, while useful, can present certain drawbacks. For example, the forces exhibited by each passive mechanism may need to be incorporated into and/or compensated for by the active feedback mechanism. This can make implementation of the active feedback mechanism potentially more complex and costly.

BRIEF SUMMARY

In one embodiment, an active human-machine interface system includes a user interface, a motor, a motor controller, an electrically controllable damper, and a damper controller. The motor is coupled to the user interface and is configured, upon being energized, to supply a haptic feedback force to the user interface. The motor controller is coupled to, and is configured to selectively energize, the motor. The electrically controllable damper is coupled to the user interface and is configured, upon being energized, to supply a damping force to the user interface. The damper controller is in operable communication with the motor controller and is coupled to, and is configured to selectively energize, the electrically controllable damper.

In another exemplary embodiment, an active human-machine interface system includes a user interface, a plurality of motors, a plurality of motor controllers, a plurality of electrically controllable dampers, and a plurality of damper controllers. The plurality of motors are coupled to the user interface, and each motor is configured, upon being energized, to supply haptic feedback force to the user interface. The plurality of motor controllers are each coupled to, and configured to selectively energize, one of the motors. The plurality of electrically controllable dampers are each coupled to the user interface, and are each configured, upon being energized, to supply a damping force to the user interface. The plurality of damper controllers are each in operable communication with one of the motor controllers and are each coupled to, and configured to selectively energize, one of the electrically controllable dampers.

In yet another exemplary embodiment, a human-machine interface system includes a user interface, an electrically controllable damper, and a damper controller. The user interface is movable at a movement velocity. The electrically controllable damper is coupled to the user interface and is configured, upon being energized, to supply a damping force to the user interface. The damper controller is coupled to the electrically controllable damper and is operable to determine the movement velocity of the user interface and to supply a drive signal to the electrically controllable damper based on the determined movement velocity.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

Figure 1:
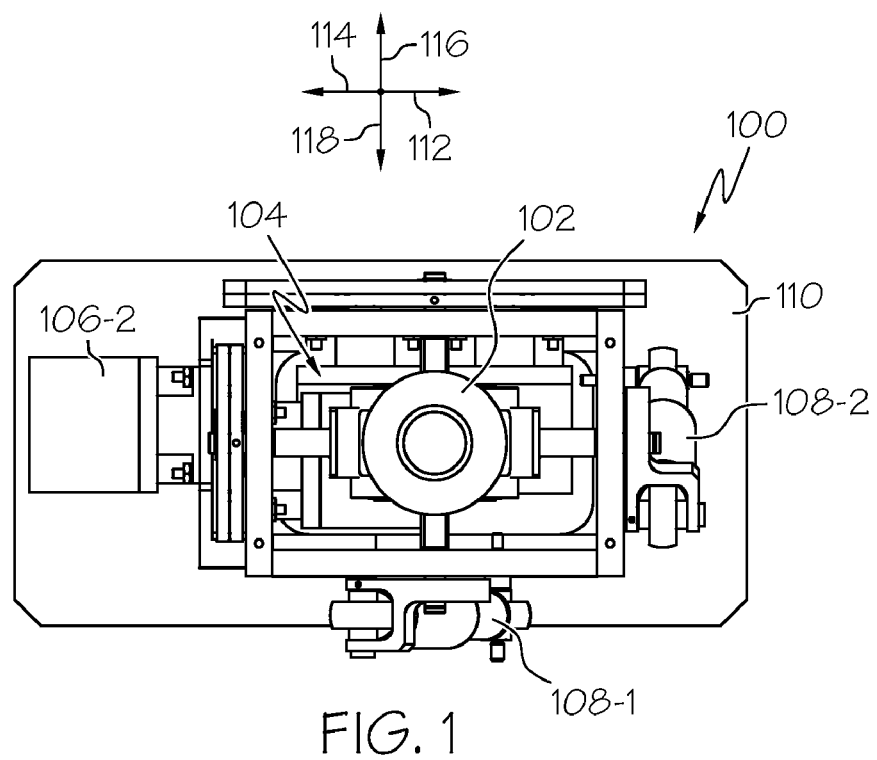
FIGS. 1-6 are top, bottom, front end, back end, left side, and right side views of an active human-machine interface control unit in accordance with an exemplary embodiment of the present invention.
Figure 2:
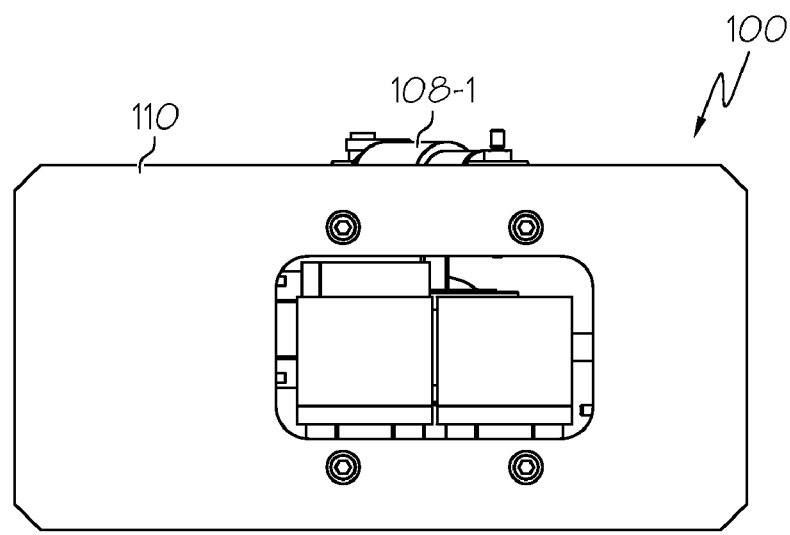
Figure 4:
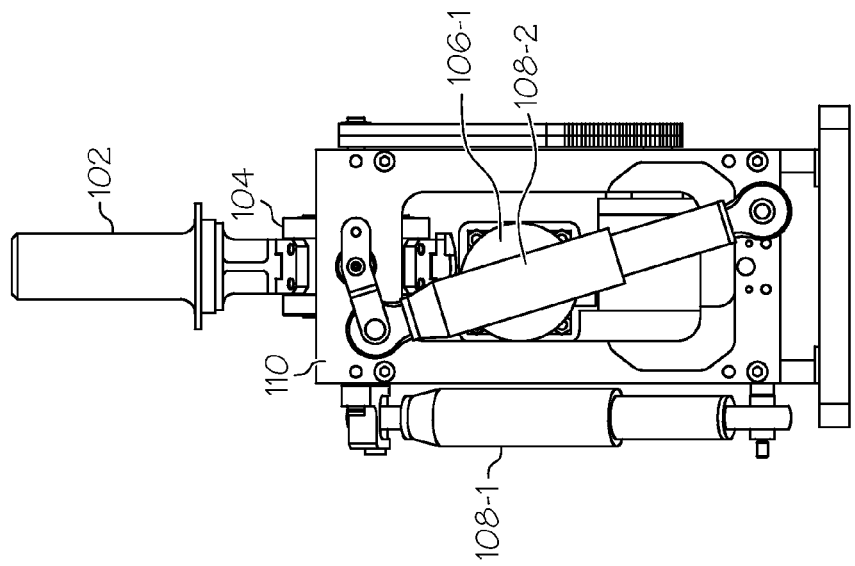
Figure 3:
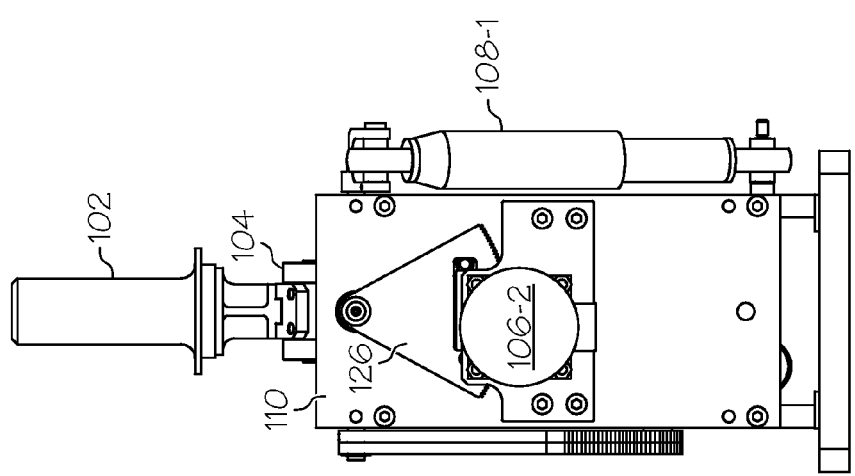
Figure 6:
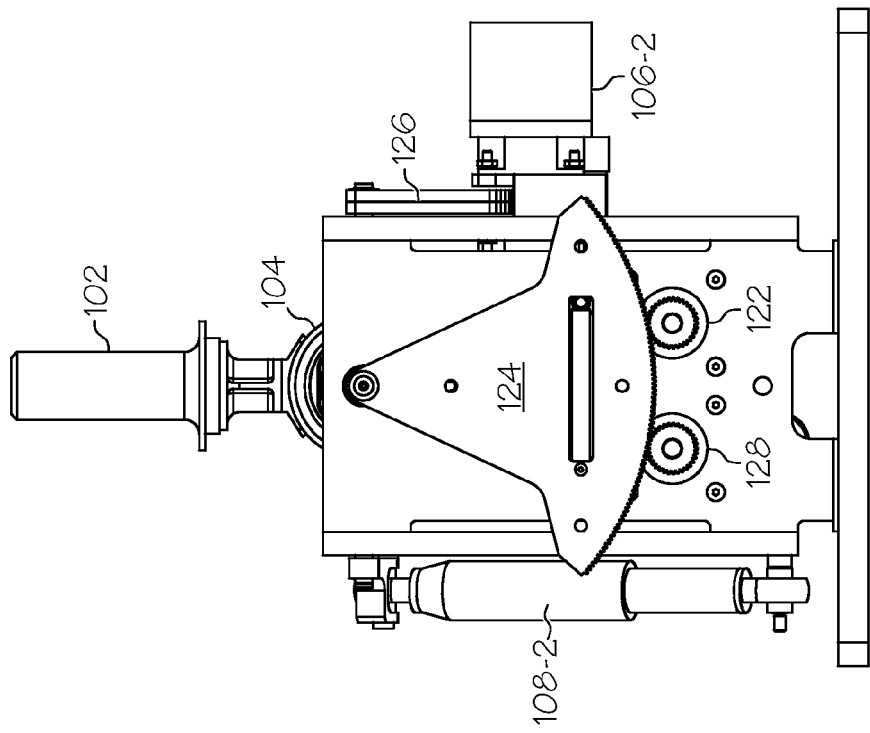
Figure 5:
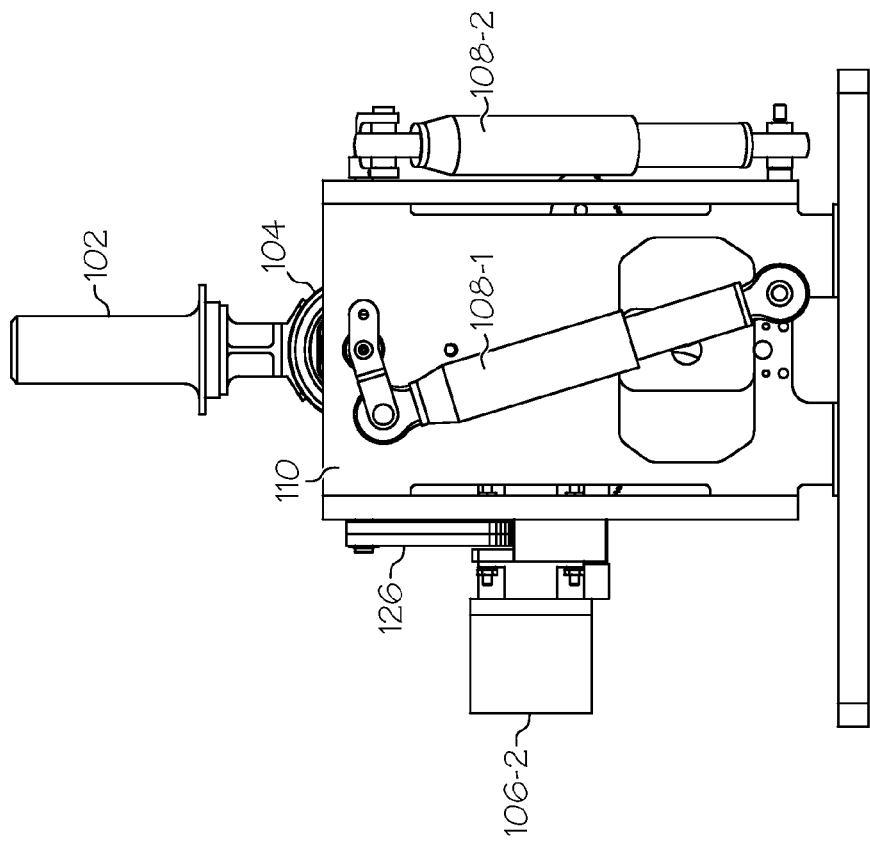

The following detailed description is merely exemplary in nature and is not intended to limit the invention or the application and uses of the invention. Furthermore, there is no intention to be bound by any theory presented in the preceding background or the following detailed description. In this regard, although the following description is, for convenience, directed to a system implemented with a user interface that is configured as a control stick, it will be appreciated that the system could be implemented with variously configured user interfaces including, for example, variously configured pedals, yokes, levers, and the like.

An exemplary embodiment of an active human-machine interface control unit 100 is depicted in FIGS. 1-6, and includes a user interface 102, a gimbal assembly 104, a plurality of motors 106, and a plurality of electrically controllable dampers 108. The user interface 102 is coupled to the gimbal assembly 104 and is configured to receive an input force from a user. The user interface 102 may be implemented according to any one of numerous configurations. In the depicted embodiment, however, it is implemented as a control stick that is preferably dimensioned to be grasped by a hand.

The gimbal assembly 104 is mounted within a housing assembly 110 and is configured to allow the user interface 102 to be moved from a null position, which is the position depicted in FIGS. 1-6, in a plurality of directions. For example, and with reference to FIG. 1, the gimbal assembly 104 allows the user interface 102 to be moved in a forward direction 112, a backward direction 114, a left direction 116, a right direction 118, a combined forward-left direction, a combined forward-right direction, a combined backward-left direction, or a combined backward-right direction, and back to or through the null position. The gimbal assembly 104 may be constructed in accordance with any one of numerous configurations now known or developed in the future. A description of the gimbal assembly is not needed to fully enable or describe the invention, and will thus not be provided.

The motors 106, which in the depicted embodiment include a first motor 106-1 and a second motor 106-2, are also mounted on the housing 110 and are used to supply force feedback to the user interface 102. The motors 106 may be implemented using any one of numerous types of motors, but in the depicted embodiment are cogless brushless motors. The first motor 106-1 is controllably energized to supply force feedback to the user interface 102 in opposition to user interface displacements having a vector component in either the forward or backward direction 112, 114, and the second motor 106-2 is controllably energized to supply force feedback to the user interface 102 in opposition to user interface displacements having a vector component in either the left or right direction 116, 118. The motors 106 are controllably energized from feedback control circuits (not depicted in FIGS. 1-6) that receive user interface movement signals from one or more non-illustrated user interface sensors and, in response to at least these user interface movement signals, controllably energize the motors 106 to supply the appropriate force feedback to the user interface 102. It will be appreciated that the user interface sensors may be implemented using position and/or force sensors.

Preferably, and as FIGS. 1-6 additionally depict, the motors 106 are each coupled to the user interface 102 via one or more gears and the gimbal assembly 104. More specifically, the first motor 106-1 includes a splined output shaft 122 that meshes with one or more first sector gears 124 (see FIG. 6). The one or more first sector gears 124 are in turn coupled to the gimbal assembly 104. Similarly, although not visible in FIGS. 1-6, the second motor 106-1 includes a splined output shaft that meshes with one or more second sector gears 126. The one or more second sector gears 126 are also coupled to the gimbal assembly 104. The one or more first and one or more second sector gears 124, 126 are each configured to supply the appropriate, and preferably equivalent, gear reduction between the respective motors 106-1, 106-2 and the user interface 102. In the depicted embodiment, an anti-backlash gear 128 is also included with each sector gear 124, 126 (only one depicted in FIG. 6), though in various other embodiments the anti-backlash gear 128 is not included.

The electrically controllable dampers 108, which in the depicted embodiment include a first damper 108-1 and a second damper 108-2, are mounted on the housing 110 and are used to selectively supply force feedback to the user interface 102. The dampers 108 are also each coupled to the user interface 102 via the gimbal assembly 104, with the first damper 108-1 configured to selectively supply force feedback to the user interface 102 in opposition to user interface displacements having a vector component in either the forward or backward direction 112, 114, and the second damper 108-2 is configured to selectively supply force feedback to the user interface 102 in opposition to user interface displacements having a vector component in either the left or right direction 116, 118.

Figure 7:
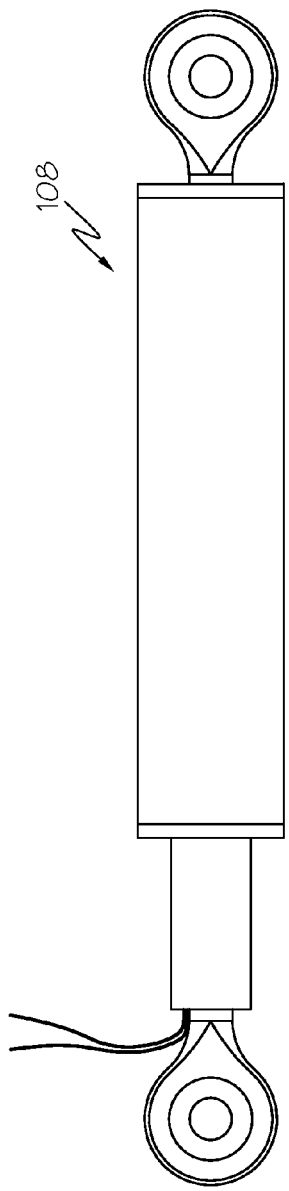
FIG. 7 is a side view of a controllable damper that may be used in the control unit depicted in FIG. 1.

The dampers 108 selectively supply a damping feedback force to the user interface 102 in response to being selectively and controllably energized. It will be appreciated that the dampers 108 may be selectively and controllably energized from either the same feedback control circuits that controllably energize the motors 106, or from one or more backup control circuits. In either case, the dampers 108, when controllably energized, supply a damping feedback force to the user interface 102 based on an amount of current supplied to the dampers 108. Preferably, each damper 108, an exemplary embodiment of which is depicted in FIG. 7, is implemented using magneto-rheological (MR) controllable friction dampers. Although any one of numerous types of known MR dampers may be used, one exemplary type of damper is one sold by Lord Corporation, having a part number RD-1133-01X.

Figure 8:
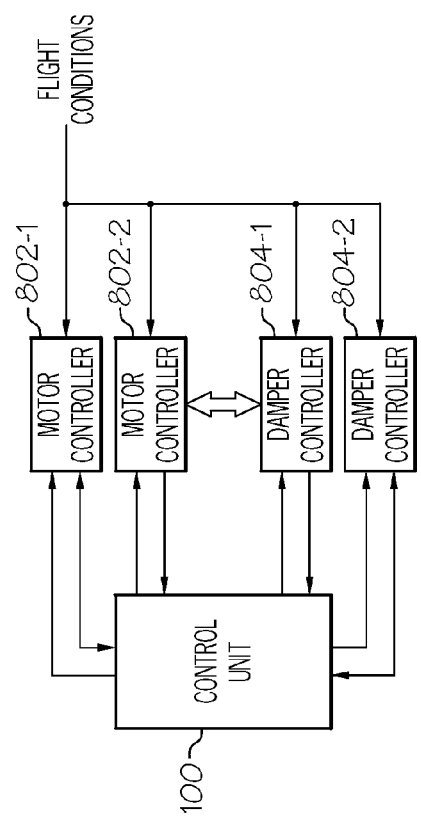
FIG. 8 is a functional block diagram of an exemplary feedback control mechanism that may be used with the control unit of FIG. 1.

Turning now to FIG. 8, a functional block diagram of an exemplary feedback control mechanism coupled to the above-described active human-machine interface control unit 100 is depicted and will be briefly described. The feedback mechanism 800 includes a pair of motor controllers 802, and a pair of damper controllers 804. The pair of motor controllers 802 receives the user interface movement signals from the control unit 100 that are representative of user interface movement and, in response, controls the supply of current to its associated motor 106, to thereby control the feedback force its associated motor 106 supplies to the user interface 102. Although two separate motor controllers are depicted in FIG. 8, it will be appreciated that a single multi-channel controller could be used to controllably energize each motor 106. It will additionally be appreciated that the motor controller (or controllers) may be implemented in accordance with any one of numerous suitable configurations for implementing the described functionality.

The damper controllers 804 are also coupled to the control unit 100 and are each in operable communication with an associated the motor controller 802. The damper controllers 804 are configured to determine operability of its associated feedback control loop (e.g., the associated motor 106, and associated motor controller 802) and to selectively supply current to an associated damper 108. It will be appreciated that this determination may be made within each damper controller 804, or in response to one or more signals supplied to the damper controllers 804. In one embodiment, the damper controllers 804 are configured such that, during normal operation, when the associated main feedback control loops are operable, the damper controllers 804 do not supply current to the dampers 108. As a result, neither damper 108 supplies any damping force to the user interface 102. However, if all or a portion of an associated main feedback control loop becomes inoperable, one or both damper controllers 804 will controllably supply current to its associated damper 108 to control the feedback force. Although two separate damper controllers are depicted in FIG. 8, it will be appreciated that a single multi-channel controller could also be used. Moreover, the damper controller function could be implemented into the single or plural motor controllers 802.

In addition to the above, in an aircraft environment, in which the control unit is used to control the positions of aircraft flight control surfaces, the motor controllers 802 and damper controllers 804 also preferably receive one or more airframe signals representative of aircraft flight conditions. The controllers 802, 804 use these airframe signals to further control the current to the motors 106 and/or dampers 108. In alternative embodiments, the dampers 108 could be controlled via one or more controllers external to the system, such as a flight control system control unit.

In still another embodiment, the damping controllers 804 are configured such that, during normal operation, the damper controllers 804 may selectively supply current to the associated dampers 108. More specifically, during normal operation, the damper controllers 804 will supply current to the appropriate damper 108 only under certain conditions. For example, during some flight maneuver conditions, as determined using the signals representative of aircraft flight conditions, the damper controllers 804 may supply current to the associated dampers 108 to assist the motors 106 in supplying appropriate haptic feedback to the user interface 102.

No matter the particular source of controlled current to the dampers 108, the controlled current source is normally in a standby mode and does not supply current, or only selectively supplies current, to the dampers 108. Thus, the dampers 108 supply minimal friction force to the system. If, however, a determination is made that one or both motors 106 or motor controllers 802 is/are inoperable, or one or more of these components is/are otherwise unable to supply the force feedback, one or both of the damper controllers 804 will controllably supply current to the appropriate dampers 108 to supply backup force feedback to the user interface 102.

In addition to being implemented in an active user interface haptic feedback control system, as described above, the dampers 108 may also be implemented in a passive haptic feedback system. More specifically, in a user interface system that does not use motors, or other active devices, to supply haptic feedback to the user interface. In such embodiments, the damper controllers 804 are configured to control the dampers 108 to behave as a viscous damper. As is generally known, viscous dampers supply a force that is proportional to velocity. Thus, the damper controllers 804 are configured to supply drive signals that are a function of velocity. The manner in which the damper controllers 804 generate and supply these drive signals may vary, but in one embodiment the damper controllers 804 differentiate a position signal to determine user interface velocity. In another embodiment, the damper controllers 804 may be configured to rectify the generated rate signals. This would simplify the power amplification circuitry, making it omni-directional, rather than bi-directional, since the dampers 108 work with either polarity. In yet another embodiment, the damper controllers 804 may be configured to implement a non-linear function between the rectification and the dampers 108 to counteract any non-linear characteristics of the MR dampers 108.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention.

What is claimed is:

1. An active human-machine interface system, comprising:
a user interface;
a motor coupled to the user interface and configured, upon being energized, to supply a haptic feedback force to the user interface;
a motor controller coupled to, and configured to selectively energize, the motor;
an electrically controllable damper coupled to the user interface and configured, upon being energized, to supply a damping force to the user interface; and
a damper controller in operable communication with the motor controller and coupled to the electrically controllable damper, the damper controller configured to determine operability of the motor and the motor controller and to selectively energize the electrically controllable damper only if it determines that at least one of the motor or the motor controller are inoperable.

2. The system of claim 1, wherein the electrically controllable damper comprises a magneto-rheological (MR) controllable friction damper.

3. The system of claim 1, wherein:
the motor controller is adapted to receive one or more airframe signals representative of one or more aircraft conditions and is operable to selectively energize the motor based in part on the one or more airframe signals; and
the damper controller is adapted to receive one or more airframe signals representative of one or more aircraft conditions and is operable to selectively energize the electrically controllable damper based in part on the one or more airframe signals.

4. The system of claim 1, further comprising:
a user interface sensor coupled to the user interface and operable to supply user interface movement signals representative of user interface movement.

5. The system of claim 4, wherein:
the motor controller is coupled to receive the user interface movement signals and is operable to selectively energize the motor based at least in part on the user interface movement signals; and
the damper controller is coupled to receive the user interface movement signals and is operable to selectively energize the electrically controllable damper based at least in part on the user interface movement signals.

6. The system of claim 5, wherein the damper controller is further operable to determine operability of the motor and the motor controller and to selectively energize the electrically controllable damper based at least in part on this determination.

7. The system of claim 6, wherein the damper controller is configured to selectively energize the electrically controllable damper, based at least in part on the user interface movement signals, only if it determines that at least one of the motor or the motor controller are inoperable.

8. An active human-machine interface system, comprising:
a user interface;
a plurality of motors coupled to the user interface, each motor configured, upon being energized, to supply haptic feedback force to the user interface;
a plurality of motor controllers, each motor controller coupled to, and configured to selectively energize, one of the motors;
a plurality of electrically controllable dampers coupled to the user interface, each electrically controllable damper configured, upon being energized, to supply a damping force to the user interface; and
a plurality of damper controllers, each damper controller in operable communication with one of the motor controllers and coupled to one of the electrically controllable dampers, configured to determine operability of one of the motors and one of the motor controllers and to selectively energize one of the electrically controllable dampers only if it determines that at least one of the motors or one of the motor controllers are inoperable.

9. The system of claim 8, wherein each of the plurality of electrically controllable dampers comprises a magneto-rheological (MR) controllable friction damper.

10. The system of claim 8, wherein:
each of the plurality of motor controllers is adapted to receive one or more airframe signals representative of one or more aircraft conditions and is operable to selectively energize one of the motors based in part on the one or more airframe signals; and each of the plurality of damper controllers is adapted to receive one or more airframe signals representative of one or more aircraft conditions and is operable to selectively energize one of the electrically controllable dampers based in part on the one or more airframe signals.

11. The system of claim 8, further comprising:

a user interface sensor coupled to the user interface and operable to supply user interface movement signals representative of user interface movement.

12. The system of claim 11, wherein:

the motor controller is coupled to receive the user interface movement signals and is operable to selectively energize the motor based at least in part on the user interface movement signals; and the damper controller is coupled to receive the user interface movement signals and is operable to selectively energize the electrically controllable damper based at least in part on the user interface movement signals.

13. The system of claim 12, wherein each of the plurality of damper controllers is further operable to determine operability of one of the motors and one of the motor controllers and to selectively energize one of the electrically controllable dampers based at least in part on this determination.

14. The system of claim 13, wherein each of the plurality of damper controllers is configured to selectively energize one of the electrically controllable dampers, based at least in part on the user interface movement signals, only if it determines that at least one of the motors or one of the motor controllers are inoperable.

* * * * *